Feb. 11, 1930.   F. PAGANO   1,747,129
COFFEE CABINET
Filed Aug. 25, 1927   2 Sheets-Sheet 1
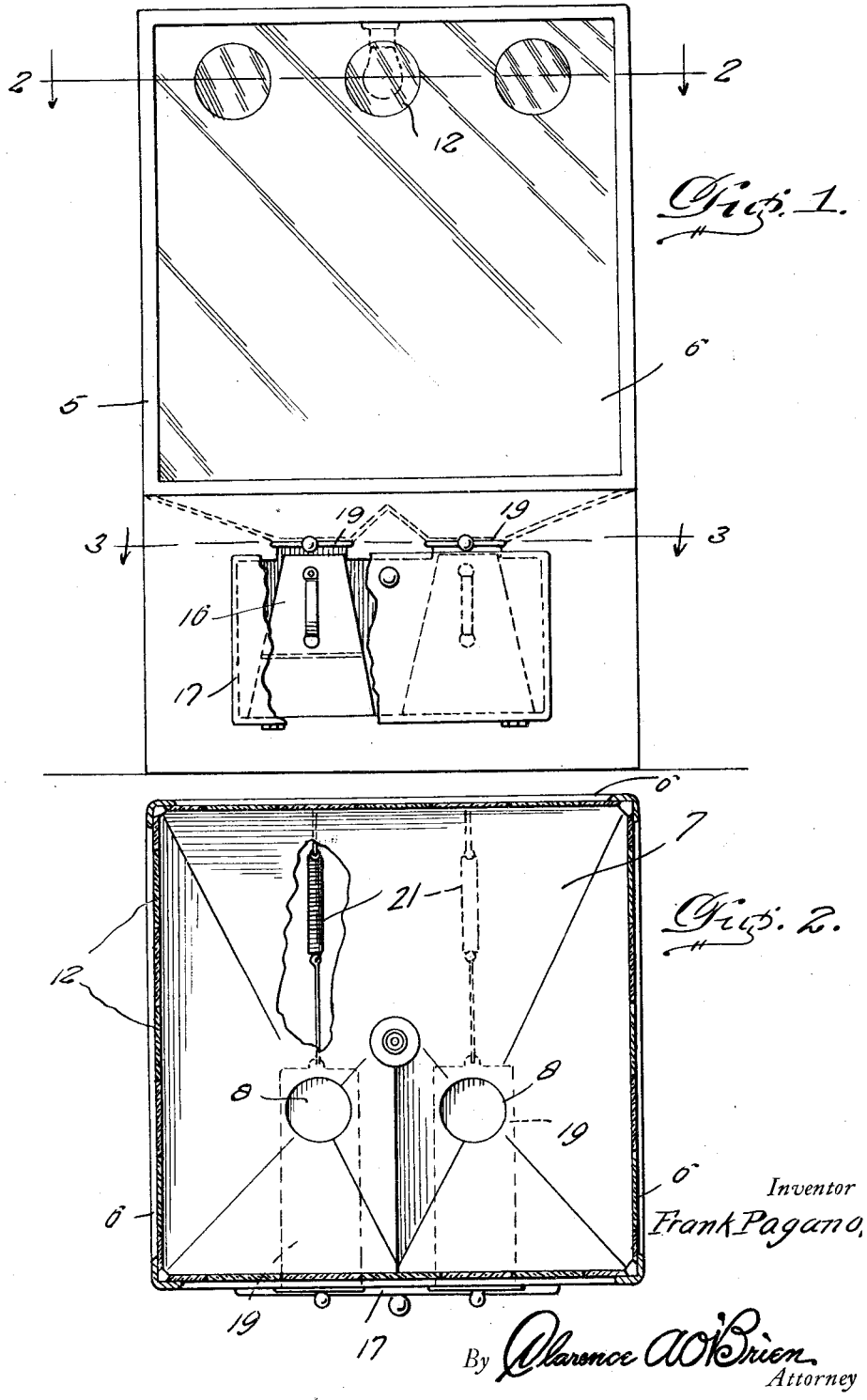

Feb. 11, 1930.  F. PAGANO  1,747,129
COFFEE CABINET
Filed Aug. 25, 1927   2 Sheets-Sheet 2
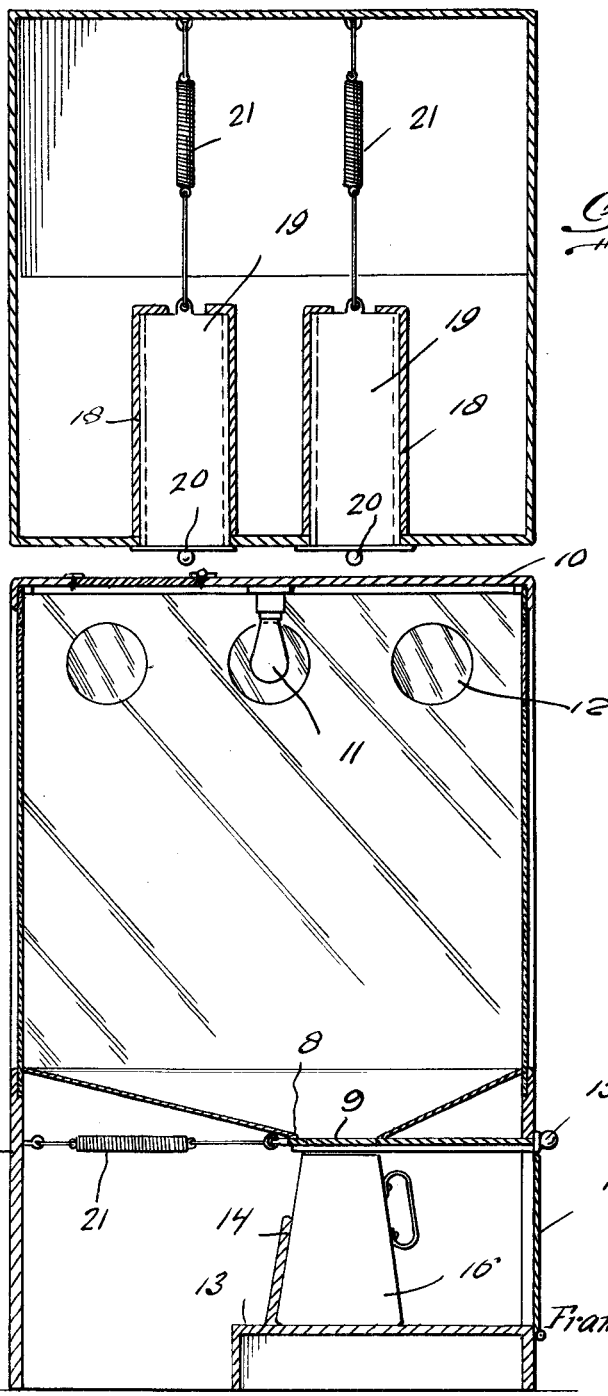
Inventor
Frank Pagano,
By Clarence A. O'Brien
Attorney Patented Feb. 11, 1930

1,747,129

UNITED STATES PATENT OFFICE

FRANK PAGANO, OF PENNS GROVE, NEW JERSEY

COFFEE CABINET

Application filed August 25, 1927. Serial No. 215,388.

This invention relates to new and useful improvements in cabinets adapted for the purpose of retaining and dispensing coffee and aims to provide a cabinet wherein the contents thereof may be viewed by the customer and wherein the coffee may be readily drawn therefrom by gravity into suitable containers so that the same may be packaged and dispensed to the customer.

In carrying out the present invention there is provided a structure including a cabinet, the side walls of which are of transparent material and within which cabinet is to be disposed the coffee, the bottom wall of the cabinet being provided with a pair of openings normally closed by sliding doors, the construction being further such as to permit containers to be arranged beneath the openings and filled by moving the doors to open position.

An important object of the invention is to provide a cabinet of this character that is of relatively simple construction and that will provide an attractive fixture within a store and that will facilitate to a great extent the dispensing of its contents.

In the drawings:—

Figure 1 is a front elevation of my improved cabinet, a swinging door that comprises a part of the cabinet being partially broken away.

Figure 2 is a detail horizontal section taken substantially upon the line 2—2 of Figure 1 looking downwardly in the direction of the arrows.

Figure 3 is a detail horizontal section taken substantially upon the line 3—3 of said Figure 1 and also looking downwardly in the direction of the arrows, and Figure 4 is a detail vertical section through the cabinet.

Now having particular reference to the drawings my novel cabinet consists of a substantially rectangular shaped metallic frame 5, the side walls of which are open at a point considerably above the lower edge thereof so that glass panels 6 may be disposed therein and retained in any suitable manner. Arranged horizontally within the frame beneath the transparent panels 6 is a bottom wall 7 that is shaped to converge to a pair of spaced circular discharge openings 8—8 between which the material comprising the bottom wall is raised to provide a partition 9 having sloping side walls whereby the material within the container formed by the glass panel 6 of said bottom wall 7 will be caused to flow by gravity to the openings 8—8.

The top wall 10 of the cabinet is provided with a suitable charging door as suggested in Figure 4, while suspended from the top wall of the cabinet is an electric light 11, electrically connected to a source of supply.

The glass panels 6 forming the four sides of the coffee chamber proper are constructed at their upper edges with circular colored inserts 12 to give the structure an ornamental appearance.

Formed within the frame beneath the bottom wall 7 of the coffee chamber proper is a horizontal platform 13 provided at its rear edge with an upwardly extending wall 14, the front and forwardly inclined wall of the cabinet being provided with a container inlet opening 15 whereby measuring containers 16—16 may be supported upon the platform directly beneath the exhaust openings 8—8 of the coffee chamber bottom wall as clearly indicated in Figure 4, the vertical wall 14 of the platform limiting the rearward movement of these containers as is obvious. This opening 15 is normally closed by a hinged door 17 while any character of lock or latch may be provided between the door and the cabinet.

Formed horizontally beneath the openings 8—8 in the coffee chamber bottom wall 7 are sliding door guides 18—18 within which are slidably mounted doors 19—19, the outer ends of which are provided with suitable pull knobs 20—20, the inner ends of these doors are connected with retractile coil springs 21—21 that are in turn connected at their opposite ends to the back wall of the cabinet, and serve to normally maintain the doors 19—19 in closed position so that the material within the chamber cannot discharge through the openings 8—8. However after the containers 16—16 have been arranged upon the platform 13 beneath said openings either one or both of the doors may be slid forwardly for obviously uncovering the openings which will permit the contents of the chamber to enter said containers.

It will thus be seen that I have provided a highly novel, simple and extremely useful coffee cabinet that is well adapted for all the purposes heretofore designated, even though I have herein shown and described the invention as consisting of certain detail structural elements it is nevertheless to be understood that some changes may be made therein without affecting the spirit and scope of the appended claim.

Having thus described the invention, what I claim as new is:—

A coffee cabinet of the class described, comprising a housing provided with a coffee containing compartment at its upper interior, the said compartment being formed with a coffee discharge opening in the bottom thereof, a platform arranged beneath said opening, and a forwardly inclined upstanding wall at the inner end of said platform for abutment with the usual inclined side wall of a coffee pot for centering the latter beneath the discharge opening.

In testimony whereof I affix my signature.

FRANK PAGANO.